United States Patent [19]

Cranford, III

[11] Patent Number: 5,761,086
[45] Date of Patent: Jun. 2, 1998

[54] APPARATUS AND METHOD FOR MONITORING PRESSURE-TEMPERATURE MARGINS

[75] Inventor: Elwyn L. Cranford, III, Greensburg, Pa.

[73] Assignee: Westinghouse ELectric Corporation, Pittsburgh, Pa.

[21] Appl. No.: 600,785

[22] Filed: Feb. 13, 1996

[51] Int. Cl.$^6$ ............................................. G01M 3/00
[52] U.S. Cl. ..................... 364/508; 364/507; 364/511; 364/557; 364/558; 376/247
[58] Field of Search .................... 364/507–511, 524, 364/188, 550, 551.01, 557, 558, 138; 73/619, 622; 374/115, 166, 141, 4, 102, 103, 107; 376/216, 249, 247, 245; 340/614, 501, 517–519; 395/906, 907, 914, 915, 50

[56] References Cited

U.S. PATENT DOCUMENTS

| | | | |
|---|---|---|---|
| 4,370,889 | 2/1983 | Ruthrof et al. | 73/619 |
| 4,384,793 | 5/1983 | O'Brien | 374/115 |
| 4,440,509 | 4/1984 | Agarwal | 374/166 |
| 4,482,519 | 11/1984 | Bull et al. | 376/247 |
| 4,483,631 | 11/1984 | Kydd | 374/141 |
| 4,552,718 | 11/1985 | Impink, Jr. et al. | 376/216 |
| 4,675,147 | 6/1987 | Schuefer et al. | 376/245 |
| 4,764,882 | 8/1988 | Braschel et al. | 364/508 |
| 4,774,049 | 9/1988 | Impink, Jr. et al. | 376/245 |
| 4,801,421 | 1/1989 | Ackerson et al. | 376/249 |
| 4,997,617 | 3/1991 | Newton et al. | 376/247 |
| 5,167,010 | 11/1992 | Elm et al. | 395/50 |

FOREIGN PATENT DOCUMENTS

| | | | |
|---|---|---|---|
| 0088572 | 9/1983 | European Pat. Off. | G21C 17/00 |
| 0411869 | 7/1990 | European Pat. Off. | |
| 58-134313 | 8/1983 | Japan | G05B 23/02 |

OTHER PUBLICATIONS

C.B. Buchalet et al., *Method for Fracture Mechanics Analysis of Nuclear Reactor Vessels Under Severe Thermal Transients*, pp. 1–12, Aug. 6, 1975, ASME.

H. Jackson, *Methods and Limitations for In-Service Inspection of Nuclear Power Plant*, pp. 61–64, Oct. 1976, Nuclear Engineering International.

R.L. Tuner et al., *Fracture Mechanics Evaluation of Heating the Refueling Water Storage Tank for the H.B. Robinson Reactor Vessel Beltline Following a Postulated Small LOCA Transient*, pp. i–7–6, Apr. 1983, WCAP 10309, Class 3.

*Primary Examiner*—Emanuel Todd Voeltz
*Assistant Examiner*—Hal D. Wachsman

[57] ABSTRACT

A real-time parameter margin monitoring system, for a pressurized vessel of an operating nuclear power plant, includes a data acquisition subsystem for acquiring a plurality of real-time parameters associated with the pressurized vessel; a first subsystem for determining a plurality of characteristic parameters from the real-time parameters; a second subsystem for determining a normal operating envelope associated with the pressurized vessel, with the normal operating envelope having a plurality of dimensions each of which corresponds to one of the characteristic parameters, and with each of the dimensions having at least one limit associated with the corresponding one of the characteristic parameters; and a display subsystem for displaying at least one representation of at least some of the characteristic parameters and displaying representations of at least some of the limits of the normal operating envelope, with the representation of some of the characteristic parameters being associated with some of the limits of the normal operating envelope.

20 Claims, 6 Drawing Sheets

APPARATUS AND METHOD FOR MONITORING PRESSURE-TEMPERATURE MARGINS

BACKGROUND OF THE INVENTION

1. Field of the Invention

This invention relates to an apparatus and method for real-time monitoring of an industrial process, during both normal and abnormal temperature and/or pressure transients and, more particularly, to an apparatus and method for presenting to a plant operator a visual representation of various parameters, such as rate of change of temperature, change of temperature, pressure, and/or minimum temperature, which are associated with a predefined design criteria for operation of a fluid containing vessel such as a pressurized vessel.

2. Background Information

The pressurized vessel in which the core of a nuclear reactor is housed is subjected throughout its nominal 40 year life to stresses induced by changes in reactor coolant temperature and pressure. During normal operations, these stresses are of moderate rate and amplitude and have no significant adverse affect on the vessel which is designed with a large safety margin to withstand the expected loading. These normal operations include heat up and cool down where restrictive schedules are rigorously followed to maintain the stresses within prescribed limits.

During some abnormal operations, such as a loss of coolant accident, temperature and/or pressure transients may be experienced which far exceed those occurring during normal operations. Though some abnormal events may not themselves impose serious stresses on the vessel, corrective action taken to alleviate the initial problem, such as injecting cold water into the reactor, may lead to transients which could be a threat to vessel integrity.

It is necessary for the operator of a nuclear power plant to be constantly aware of the status of the reactor pressurized vessel with respect to non-ductile failure. Heatup/cooldown curves, for example, define the allowable pressure and temperature domain. These curves can also be utilized during an abnormal event to determine if the temperature and pressure transients remain within the limits established by the curves. The heatup/cooldown curves are generated in accordance with Appendix G of Section III of the American Society of Mechanical Engineers Boiler and Pressure Vessel Code (A.S.M.E. Code). Such curves are required in order to certify the safety of the pressurized vessel under all possible loading conditions and are mandated by the Nuclear Regulatory Commission (NRC) for use during normal startup and shutdown of the reactor.

Operators of pressurized vessels subject to NRC regulations are required to maintain surveillance of the actual loading conditions and to perform in-service inspections for flaws in order to assure compliance with the loading assumptions made during the design process. In the event that any loading condition (e.g., a "Limiting Condition for Operation" defined by the technical specifications for the pressurized system) occurs which results in an operating state that was not considered in the design basis, the operator is required to recover to acceptable conditions immediately and determine the impact of the loading on the structural integrity of the pressurized vessel. Under present practice, the NRC requires that if the heatup/cooldown curve limits are exceeded during a transient, an analysis must be performed to determine if conditions have occurred which could cause potential flaws to be initiated in the vessel. Such an analysis is performed after the fact and can cause a delay in returning the unit to power where the results indicate that critical conditions were not reached. Of course, if the analysis indicated that critical conditions had existed, then detailed inspections and/or repairs may have to be performed.

Protection against non-ductile failure (i.e., brittle fracture or failure) is based on "toughness," a material property, which is a measure of the material's resistance to failure in a non-ductile manner. Nil-ductility transition temperature, commonly referred to as $RT_{ndt}$ is one of the related measurable material properties of metal alloy materials. $RT_{ndt}$ is the reference temperature at which the material failure mechanism changes from a ductile failure mode to a brittle failure mode.

U.S. Pat. No. 4,801,421 discloses a system which provides an accurate, easily understood, on-line, real-time representation of the integrity status of a vessel containing a fluid subject to varying temperature and pressure conditions. The system generates a display which presents the operator with a real-time visual indication of the current margin to non-ductile failure for selected critical pressurized vessel locations. The system monitors the fluid temperature and pressure and generates therefrom real-time representations of the margin to non-ductile failure at selected critical points in the vessel for all flaw depths of interest through the vessel wall.

A distribution through the vessel wall of the reference $RT_{ndt}$ required for flaw initiation as a result of transients in the fluid temperature and pressure is generated and displayed together with a distribution of the actual $RT_{ndt}$ to provide a visual comparison of the actual and reference distributions. The spacing between the displayed actual $RT_{ndt}$ and reference $RT_{ndt}$ distributions provides a visual indication of the margin to non-ductile failure across the entire depth of the vessel wall at each critical location. The system provides a real-time visual display of the depth at which a running flaw, if it existed, should terminate.

Although U.S. Pat. No. 4,801,421 displays in real-time a margin between the actual and reference $RT_{ndt}$ distributions, there is room for improvement.

SUMMARY OF THE INVENTION

The present invention is directed to a real-time parameter margin monitoring system, for an operating industrial process, including a data acquisition mechanism for acquiring a plurality of real-time parameters associated with the operating industrial process; a first determining mechanism for determining a plurality of characteristic parameters from the real-time parameters; a second determining mechanism for determining a normal operating envelope associated with the operating industrial process, with the normal operating envelope having a plurality of dimensions each of which corresponds to one of the characteristic parameters, and with each of the dimensions having at least one limit associated with the corresponding one of the characteristic parameters; and an output mechanism for outputting at least one representation of at least some of the characteristic parameters and outputting representations of at least some of the limits of the normal operating envelope, with the representation of some of the characteristic parameters being associated with some of the limits of the normal operating envelope.

As another aspect of the invention, a real-time parameter margin monitoring system, for an operating nuclear power plant including a pressurized vessel having a fracture envelope associated therewith, includes a data acquisition mechanism for acquiring a plurality of real-time parameters operatively associated with the pressurized vessel; a first determining mechanism for determining a plurality of characteristic parameters from the real-time parameters; a second determining mechanism for determining the fracture envelope of the pressurized vessel, with the fracture envelope having a plurality of dimensions each of which corresponds to one of the characteristic parameters, and with each of the dimensions having at least one limit associated with the corresponding one of the characteristic parameters; and an output mechanism for outputting at least one representation of at least some of the characteristic parameters and outputting representations of at least some of the limits of the fracture envelope, with the representation of some of the characteristic parameters being associated with some of the limits of the fracture envelope.

As another aspect of the invention, a method of real-time parameter margin monitoring, for an operating industrial process, includes the steps of acquiring a plurality of real-time parameters associated with the operating industrial process; determining a plurality of characteristic parameters from the real-time parameters; determining a normal operating envelope associated with the operating industrial process, with the normal operating envelope having a plurality of dimensions each of which corresponds to one of the characteristic parameters, and with each of the dimensions having at least one limit associated with the corresponding one of the characteristic parameters; outputting at least one representation of at least some of the characteristic parameters; and outputting representations of at least some of the limits of the normal operating envelope, with the representation of some of the characteristic parameters being associated with some of the limits of the normal operating envelope.

DESCRIPTION OF THE PREFERRED EMBODIMENT

As employed herein, the term "pressurized vessel" shall expressly include, but not be limited to any pressure retaining vessel which is subject to a fast fracture brittle failure, such as a nuclear reactor vessel, a pressurizer vessel, a steam generator or a reactor coolant pump casing.

As employed herein, the term "nuclear power plant component" shall expressly include, but not be limited to a pressurized vessel.

As employed herein, the term "electric power plant" shall expressly include, but not be limited to nuclear power plants; fossil power plants, such as coal burning, oil burning and gas burning plants, and plants for burning derivatives of coal, oil and/or gas; hydroelectric power plants; solar power plants; wind farms; and/or geothermal power plants.

As employed herein, the term "industrial process" shall expressly include, but not be limited to any industrial process employing a pressurized vessel, such as chemical processing, chemical manufacturing, industrial manufacturing, and/or electric power plants.

As employed herein, the term "envelope" shall expressly include, but not be limited to a set of operating limits of an industrial process or pressurized vessel, and a representation having plural dimensions that at least substantially covers, encloses or surrounds another representation.

Figure 1:
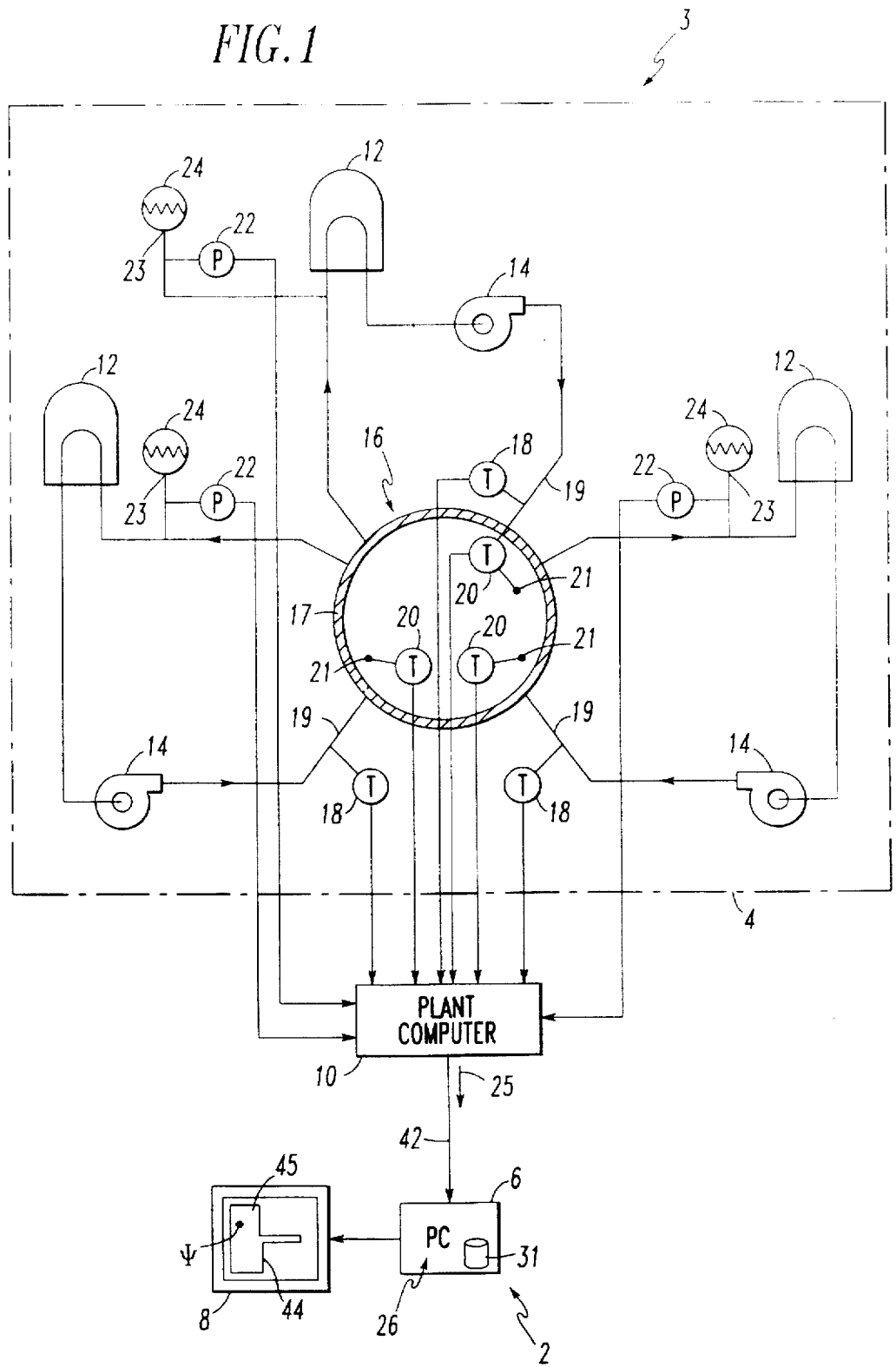
FIG. 1 is a block diagram of a real-time parameter margin monitoring system and a nuclear steam supply system of a nuclear power plant in accordance with the invention.

Referring to FIG. 1, a real-time pressure-temperature margin monitoring system 2 is illustrated for an operating industrial process, such as the exemplary nuclear power plant 3 having a nuclear steam supply system 4. The system 2 includes a personal computer (PC) 6 and a display 8, such as a VGA monitor, although the invention is applicable to a wide variety of other processors and output devices such as, for example, microprocessor based computers, workstations, minicomputers, mainframe computers or any calculating and display platform for performing communication, engineering calculations and screen or other display presentation. The system 2 also includes a data acquisition subsystem, such as the exemplary plant computer 10, although the invention is applicable to a wide variety of other processors and data acquisition mechanisms such as, for example, a distributed processing and/or data acquisition system or any system for acquiring a plurality of real-time parameters associated with an operating industrial process.

The nuclear steam supply system 4 includes a plurality of nuclear power plant components such as the exemplary plural steam generators 12, plural reactor coolant pumps 14 and a reactor 16 having an exemplary pressurized vessel 17. The nuclear steam supply system 4 is described in greater detail in U.S. Pat. No. 4,801,421 which is incorporated herein by reference. Associated with the system 4 are a plurality of temperature detectors 18, which measure corresponding cold leg temperatures 19; a plurality of thermocouples 20, which measure corresponding reactor core inlet temperatures 21; and a plurality of pressure transducers 22, which measure reactor coolant pressures 23 of corresponding pressurizers 24. The exemplary plant computer 10 performs real-time statistical screening and generates loading pressure and temperature parameters 25, which are operatively associated with the pressurized vessel 17, from the several sensors 18,20,22. Such real-time parameters reflect the real-time state of the pressurized vessel 17 with respect to fast fracture limits thereof. The plant computer 10 screens the pressures 23 and temperatures 19,21 with an appropriate statistical method in order to ensure the integrity of the loading pressure and temperature parameters 25.

The system 2 performs the functions of technical specification surveillance monitoring of: (1) heatup and cooldown rates of the pressurized vessel 17; and (2) pressure-temperature curve limits. As discussed in greater detail below with FIGS. 3–7, the system 2 quantifies pressure-temperature margins in real-time and provides that information to the operator. In turn, such real-time information may be acted upon to prevent or mitigate possible violations of the limiting conditions for operations with respect to heatup/cooldown rates and pressure-temperature limitations of the pressurized vessel 17.

A variety of loading conditions may be postulated as part of the design process of a pressurized vessel. Such loading conditions, commonly referred to as transients, are used in evaluations which qualify the structural integrity of the pressurized vessel 17. Transients are used in three general areas of evaluations to determine structural adequacy of the pressurized vessel 17: (1) on the basis of material stresses in comparison to predefined allowable stress limits; (2) with respect to fatigue strength of the material; and (3) with respect to a non-ductile failure of the material assuming that the material is flawed (e.g., a typical flaw is a 100% circumferential flaw having a depth of one quarter of the vessel's thickness).

Figure 2:
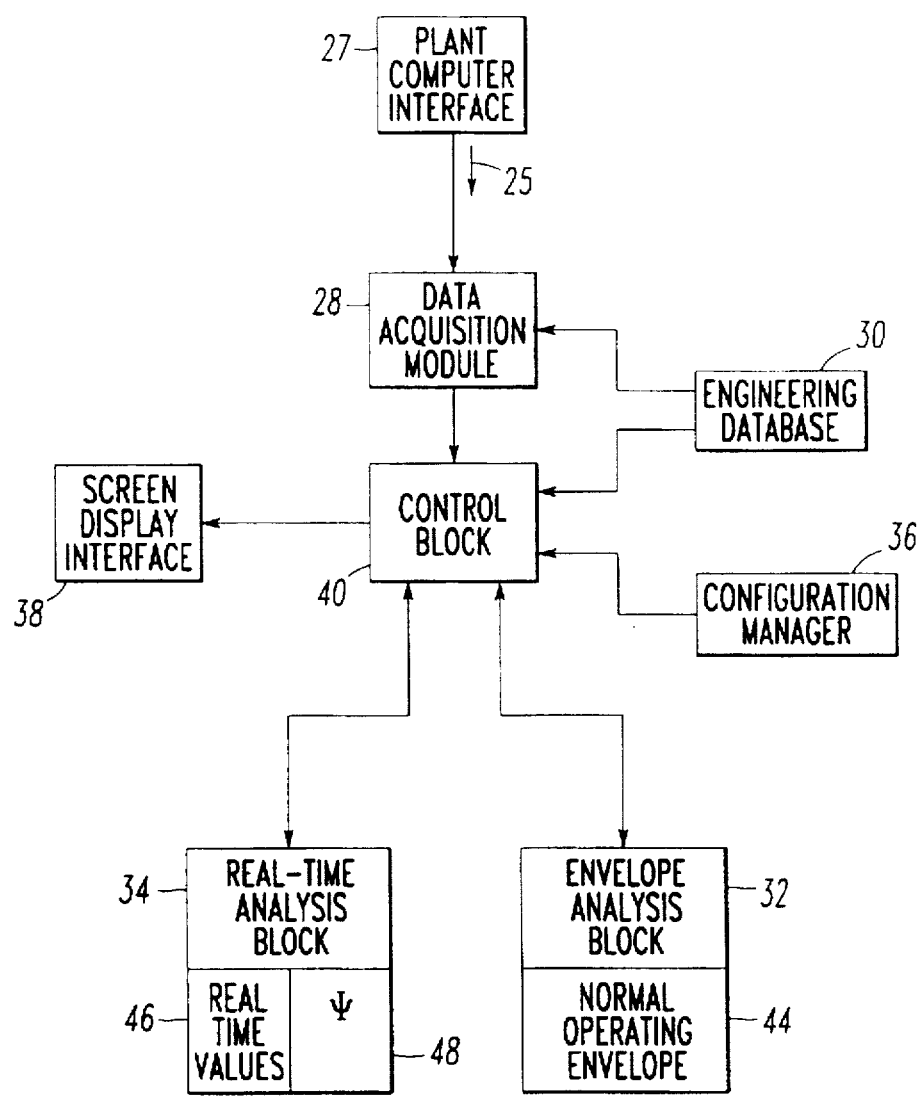
FIG. 2 is a software block diagram of the real-time parameter margin monitoring system of FIG. 1.

Also referring to FIG. 2, software 26 for the PC 6 includes a plant computer interface 27 for the plant computer 10, a data acquisition module 28, an engineering database 30 which is stored in a memory 31 of the PC 6, an envelope analysis block 32, a real-time analysis block 34, a configuration manager 36, an output subsystem such as a screen display interface 38 for the monitor 8, and a control block 40. The plant computer interface 27 provides a suitable data communications interface to the plant computer 10 using the interface 42 such as a serial data link or a local area network having a file transfer function. The interface 42 provides a "real-time" transfer of the loading pressure and temperature parameters 25 from the plant computer 10 to the data acquisition module 28 as fast as about once per minute.

The control block 40 uses the engineering database 30 and the envelope analysis block 32 to determine a plural-dimensional fracture envelope 44 associated with the pressurized vessel 17. The envelope 44 is generated from engineering fracture mechanics evaluations that are based on a set of normal and upset design transients for the nuclear steam supply system 4 including level A (i.e., normal operation conditions) and level B (i.e., upset conditions with no damage to equipment and all systems functioning normally), respectively, and emergency and faulted transients for level C (i.e., all safety systems must function normally with the possible failure of some non-safety related equipment) and level D (i.e., safe shutdown systems must function with the possible failure of other systems and equipment), respectively. Within the envelope 44 is an operating region 45 associated with normal operation of the pressurized vessel 17.

An evaluation for protection against non-ductile failure is performed, for example, knowing such factors as material properties geometry, in addition to the transient condition defined by the characteristic parameters including: (1) dT/dt (i.e., the rate of change in temperature); (2) DT (i.e., the overall change in temperature which is the integrated value of the rate dT/dt); (3) P (i.e., maximum pressure); (4) $T_{MIN}$ (i.e., minimum temperature); and (5) a postulated flaw. Several postulated flaws are used in the fracture evaluations each of which is based on the assumption that a flaw already exists in the pressurized vessel 17. The fracture evaluation is performed to determined if the flaw will remain stable or fail under the transient loading condition.

With the definition of the transient condition, suitable analysis determines whether a flaw is stable and would not result in a violation of the structural integrity of the pressurized vessel 17. Meeting such a stable criteria results in a qualified condition whereby crack arrest occurs before structural integrity is violated. Fatigue crack growth evaluations are performed to show that a crack or flaw does not reach a unacceptable size for future operations in which all postulated loading conditions apply. The exemplary real-time function is shown in Equation 1 and is determined from the loading pressure and temperature parameters 25.

$$\psi = f(dT/dt, DT, P, T_{MIN}) \quad \text{Eq. 1}$$

Temperature has an impact on a material's ductile behavior and, therefore, must be considered in the evaluation process. Typically, such process shows acceptable behavior down to some minimum temperature. As the temperature drops, compensation must be provided for other forces which affect stresses. Such compensation is a continuous function, however, it is not practical to define all of the parameters which affect structural adequacy in one expression. Therefore, for example, a parametric evaluation is performed to approximate the effects of variations in the minimum temperature. One purpose of the parametric evaluation is to establish an acceptable operating envelope over the entire operating temperature range. The parameters defining each transient in the parametric evaluation are varied in order to define a range of acceptable conditions. The parametric fracture evaluations are used in the preparation of the engineering database 30.

Defining the minimum temperature (i.e., the current temperature) for actual conditions is straightforward if the temperature is falling. In this case (i.e., a cooling transient), the current minimum temperature is the loading temperature on the loading side (i.e., the inside wall) of the pressurized vessel 17.

On the other hand, the definition of the minimum temperature is more difficult if the temperature is rising. When the wall of the pressurized vessel 17 is subjected to a heating load on one side thereof, the temperature on the opposite side (i.e., the outside wall), which lags the temperature of the loading side (i.e., the inside wall), is determined, for example, mathematically. The amount of temperature lag is a function of the heat transfer characteristics of the material (e.g., thermal conductivity of the material; insulation, if any; and ambient or environmental loading). In this case, the minimum temperature, which is on the opposite side with respect to the loading side, is a function of the material thickness, conductivity, insulation, ambient conditions and the previous temperature load history. The value of the minimum temperature is calculated, for example, by a transfer function method. Such method uses an integrating routine with transforms solved in a suitably timely manner in order to determine the current value of the minimum temperature.

Continuing to refer to FIGS. 1 and 2, the control block 40 uses the real-time analysis block 34 to determine the real-time characteristic parameters from the loading pressure and temperature parameters 25. The real-time analysis block 34 includes a routine 46 for determining real-time values of the characteristic parameters and a routine 48 for determining the real-time function ($\psi$) including the characteristic parameters.

Following steady state conditions and in response to an event, such as a transient which causes a non-zero DT, the real-time analysis block 34 accumulates some magnitude of change and calculates the characteristic parameters. The control block 40 then determines operating margins for pre-defined brittle fracture limits of the pressurized vessel 17 with respect to the envelope 44. The control block 40 presents those results in real-time to the operator using the screen display interface 38. In turn, the characteristic parameters are used for comparison to the envelope 44.

The configuration manager 36 defines various configuration parameters such as the periodic real-time rate (e.g., every 30 seconds, 1 minute, 2 minutes or any suitable periodic real-time rate) for transferring the loading pressure and temperature parameters 25 from the plant computer 10 to the data acquisition module 28. The control block 40 interfaces the data acquisition module 28, engineering database 30, configuration manager 36 and screen display interface 38, and coordinates the calculations of the envelope analysis block 32 and real-time analysis block 34.

As discussed above, the control block 40 determines the current state of the pressurized vessel 17 by calculating the function ($\psi$) of Equation 1. The control block 40 then determines if $\psi$ is within or approaching the boundaries or limits of the envelope 44 created from the design transients. A key feature of the present invention is the presentation of the instantaneous real-time value of $\psi$ on a coordinate map of the envelope 44. The engineering design parameters that define the limits of the envelope 44 are summarized in the same terms as $\psi$ and, hence, it is possible to construct a map in a coordinate system and plot $\psi$ against the design limits. For example, two or three dimensions of the map are displayed to show the current value of $\psi$ with respect to the design limits at any instant. Because of this feature, graphic presentation of the envelope 44 is possible in order to provide pressure-temperature operating margins with respect to the pre-defined brittle fracture limits of the pressurized vessel 17.

Figure 3:
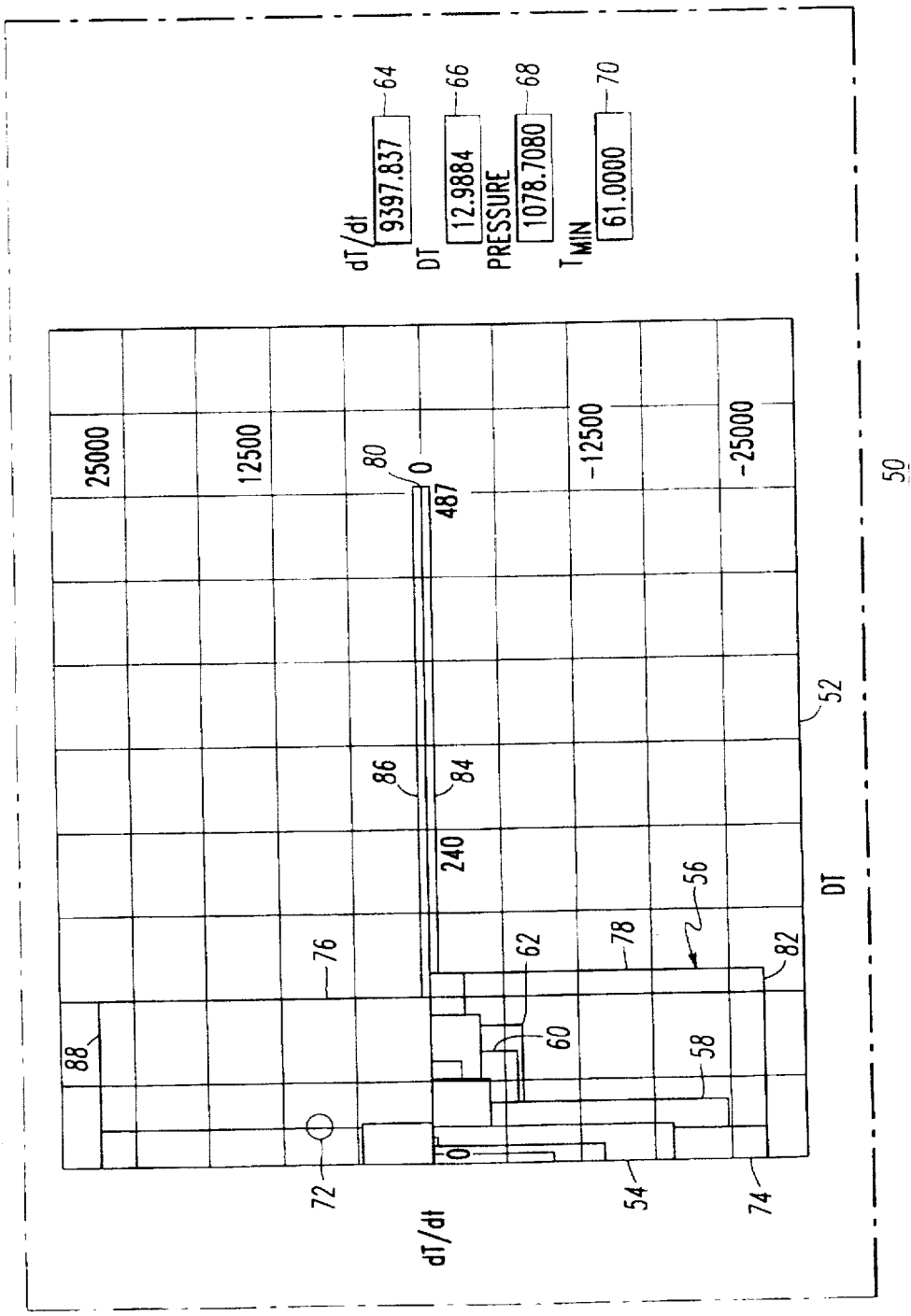
FIG. 3 is a diagram of an output display in accordance with the invention.

FIG. 3 illustrates an output display 50 of a pressure envelope in which an exemplary two of four dimensions of the fracture envelope 44 of FIG. 1 are displayed. The characteristic parameter DT is displayed on the X-axis 52 and the characteristic parameter dT/dt is displayed on the Y-axis 54. The exemplary two dimensional fracture envelope plot 56 of the exemplary four dimensional fracture envelope 44 includes a plurality of boxes, such as boxes 58,60,62, which collectively define the plot 56. Each of the boxes 58,60,62 represents a design transient each of which may have more than one box. The envelope 44 typically includes 24 or more design transients.

For each design transient, a number of fracture stability evaluations are performed. Another purpose of these evaluations is to define an acceptable range of minimum temperature $T_{MIN}$ and maximum pressure P which are associated with the dynamic thermal portion (i.e., the characteristic rate dT/dt and magnitude DT of the thermal load) of the design transient and a postulated constant flaw size. Both the minimum temperature $T_{MIN}$ and maximum pressure P are varied to maximize the range of coverage for each design transient.

The envelope analysis block 32 of FIG. 2 selects the design transients for any particular condition on the basis of the current minimum temperature $T_{MIN}$ at any point in the wall of the pressurized vessel 17 of FIG. 1. For example, in the case of a cooling transient, the current minimum temperature $T_{MIN}$ is the loading temperature on the loading side (i.e., the inside surface) of such wall. The set of the applicable boxes, including the exemplary boxes 58,60,62, is selected on the basis of that current minimum temperature $T_{MIN}$. On the other hand, in the case of a heating transient, then the current minimum temperature $T_{MIN}$ is the calculated temperature value at the opposite side (i.e., the outside surface) of such wall.

In other words, each design transient is modified to provide coverage over a wide range of lower bound temperatures. Lower temperatures result in lower maximum pressures for any given instantaneous value of the rate of change in temperature dT/dt and the current accumulated value of the overall change in temperature DT.

A further purpose of the parametric evaluations is to define a set of allowable operating characteristic parameters over a wide range of postulated minimum temperatures for each postulated transient. For each transient, the rate of change in temperature dT/dt and the current accumulated value of the overall change in temperature DT are assumed fixed, the minimum temperature $T_{MIN}$ is varied, and the maximum pressure P is calculated based on Dt/dt, DT and the current minimum temperature $T_{MIN}$. For example, four or more maximum pressure calculations may be made for each postulated design transient. Each calculation results in a set of the characteristic parameters DT/dt, DT, P and $T_{MIN}$ which constitutes the boundaries of one of the exemplary boxes 58,60,62. As a further non-limiting example, in a system employing 40 design transients, with four boxes per design transient, the envelope 44 is a function of up to 160 boxes.

As discussed above, the real-time analysis block 34 of FIG. 2 continuously determines the minimum temperature $T_{MIN}$ by monitoring the load temperature on one side of the wall of the pressurized vessel 17 of FIG. 1 and calculating the temperature on the other side of such wall. In turn, the envelope analysis block 32 employs the lowest temperature as a screening criteria to select a subset of the boxes, including the exemplary boxes 58,60,62, from all of the allowable boxes (not shown) to define the currently qualified design fracture envelope 44. When the current value ($\psi$) of the real-time function is bounded by any of the boxes in such subset, then the current state or condition of the pressurized vessel 17 of FIG. 2, with respect to fast fracture, is qualified. The currently qualified design fracture envelope 44 is displayed along with the current value ($\psi$) of the real-time function. If $\psi$ is within the boundaries of the currently displayed envelope 44 (i.e., bounded by any one of the boxes of such subset), then the current condition is qualified.

The output display 50 also includes displays 64,66,68,70 representing the real-time calculated values of the characteristic parameters dT/dt, DT, Pressure and $T_{MIN}$, respectively. As seen with the two dimensional plot 56, the X-axis 52 corresponds to the characteristic parameter DT and the Y-axis 54 corresponds to the characteristic parameter dT/dt. Displayed within the two dimensional plot 56 is a real-time representation, such as point 72 ($\psi_{2A}$), of the real-time values of DT and dT/dt plotted with respect to the axes 52 and 54, respectively. The plot 56 also displays representations 74,76,78,80 of a plurality of limits of the envelope 44 corresponding to the X-axis 52 and the characteristic parameter DT, and representations 82,84,86,88 of a plurality of limits of the envelope 44 corresponding to the Y-axis 54 and the characteristic parameter dT/dt.

Figure 4:
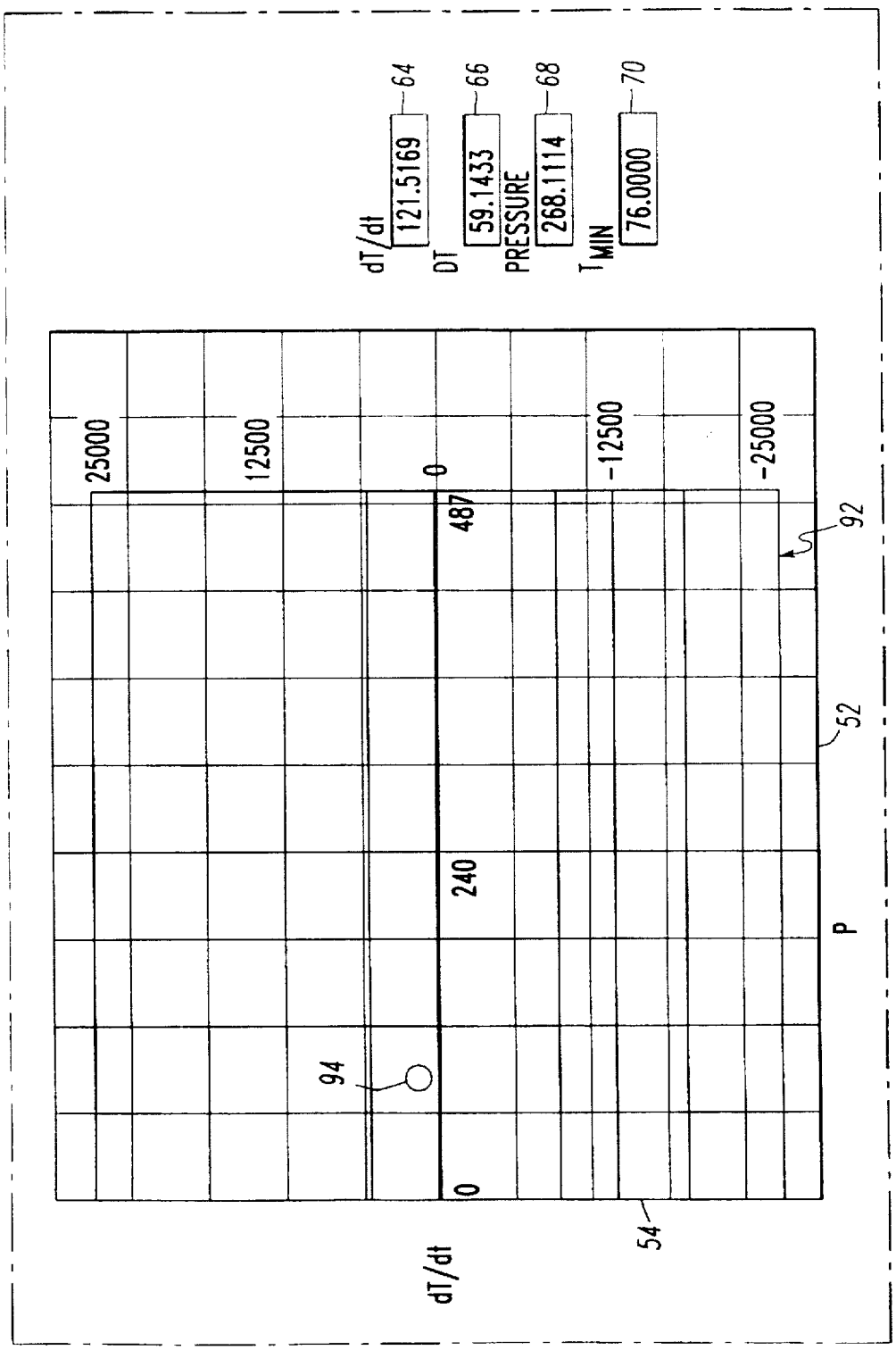
FIG. 4 is a diagram of another output display in accordance with the invention.

FIG. 4 illustrates an output display 90 of a thermal envelope in which an exemplary two of four dimensions of the fracture envelope 44 of FIG. 1 are displayed. The characteristic parameter P is displayed on the X-axis 52 and the characteristic parameter dT/dt is displayed on the Y-axis 54. Displayed within the exemplary two dimensional plot 92 of the exemplary four dimensional fracture envelope 44 is a real-time representation, such as point 94 ($\psi_{2B}$), of the real-time values of P and dT/dt plotted with respect to the axes 52 and 54, respectively.

Figure 5:
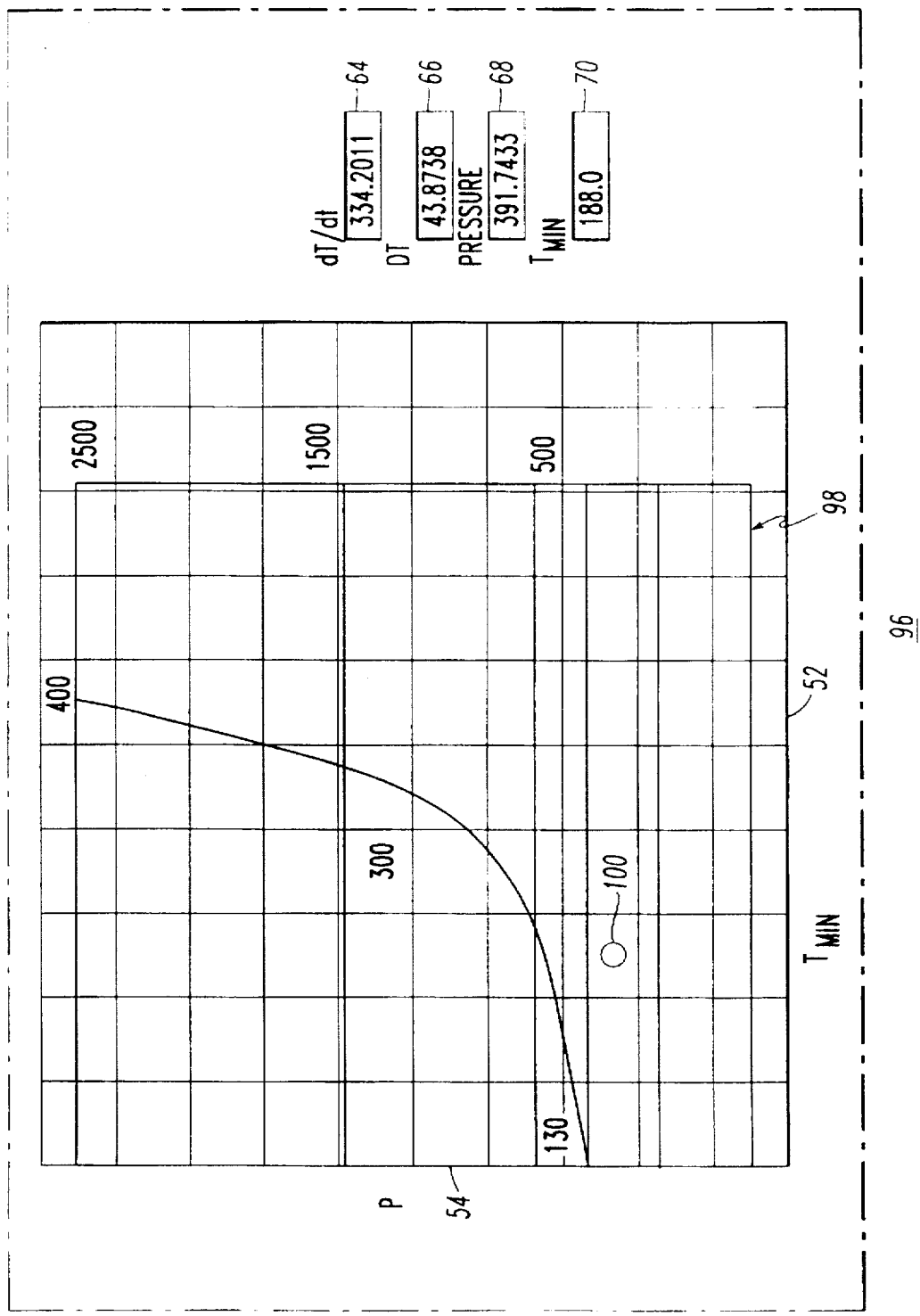
FIG. 5 is a diagram of another output display in accordance with the invention.

FIG. 5 illustrates an output display 96 of a pressure versus current minimum temperature envelope in which an exemplary two of four dimensions of the fracture envelope 44 of FIG. 1 are displayed. The characteristic parameter $T_{MIN}$ is displayed on the X-axis 52 and the characteristic parameter P is displayed on the Y-axis 54. Displayed within the exemplary two dimensional plot 98 of the exemplary four dimensional fracture envelope 44 is a real-time representation, such as point 100 ($\psi_{2C}$), of the real-time values of $T_{MIN}$ and P plotted with respect to the axes 52 and 54, respectively. Those skilled in the art will appreciate that other output displays in addition to the displays 50,90,96 are possible for any two (e.g., DT and $T_{MIN}$) of the exemplary four characteristic parameters.

Figure 6:
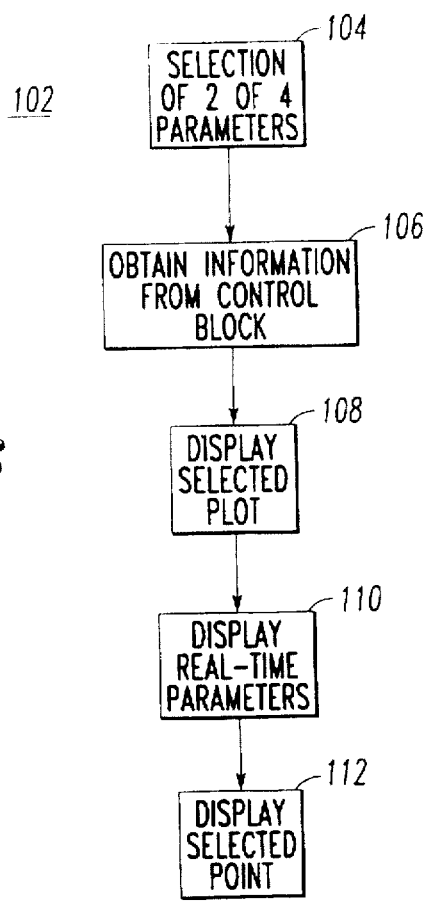
FIG. 6 is a software block diagram for the screen display interface of FIG. 2.

FIG. 6 illustrates a software routine 102 for the screen display interface 38 of FIG. 2. The routine 102 displays the two dimensional plots 56, 92 and 98, along with the points 72, 94 and 100 of FIGS. 3, 4 and 5, respectively. At step 104, two of the four characteristic parameters are selected. Next, at step 106, the definition of the selected two dimensional plot and the real-time values of the characteristic parameters are obtained from the control block 40 of FIG. 2. Then, at step 108, the selected plot, which includes some of the limits of the envelope 44 of FIG. 1, is displayed. At step 110, the real-time values 64,66,68,70 of the characteristic parameters are displayed. Finally, at step 112, the selected point is displayed within the selected plot.

Figure 7:
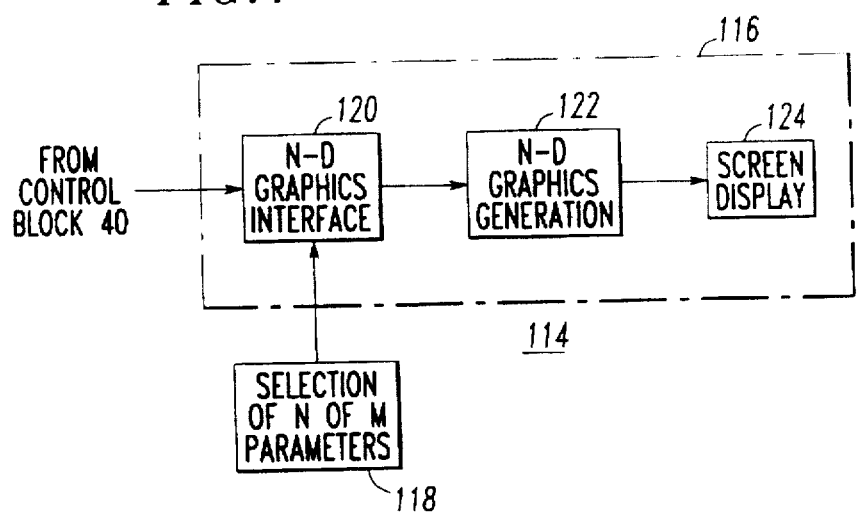
FIG. 7 is a software block diagram for the screen display interface of FIG. 2 in accordance with another embodiment of the invention.

FIG. 7 illustrates an alternative software routine 114 for the screen display interface 38 of FIG. 2. The routine 114 displays an N (e.g., three) dimensional plot of the exemplary M (e.g., four) dimensional fracture envelope 44 of FIG. 1 along with a real-time representation ($\psi_N$) of the real-time values of N of M characteristic parameters plotted with respect to N axes (e.g., X-, Y- and Z-axes) and within the N dimensional plot of the M dimensional fracture envelope. The routine 114 includes N-dimensional screen display interface 116 and a selection block 118 for the selection of N of M of the characteristic parameters. The screen display interface 116 includes an N dimensional graphics interface 120 which interfaces the control block 40 of FIG. 2 and the selection block 118, an N dimensional graphics generation block 122, and a screen display block 124 which, in the exemplary embodiment, outputs a three dimensional plot of the four dimensional fracture envelope 44 and the real-time representation ($\psi_3$) to the monitor 8 of FIG. 1.

The exemplary system 2 provides a comprehensive structural integrity monitoring program for the pressurized vessel 17 of the nuclear power plant 3 of FIG. 1. The system 2 economically addresses issues associated with design conformance monitoring, brittle fracture limits and unanticipated event structural integrity evaluations. The system 2 provides a dynamic operating limit that replaces fixed heatup and cooldown limits. This allows more rapid evolutions between cold shutdown and hot shutdown which saves time in each plant heatup and cooldown operation with respect to prior known limiting constraints. In this manner, normal heatup and cooldown rates are increased without violating the design basis and quantifiable margins are maintained with respect to designed operational limits. The system 2 provides a defined capacity for improved operations dynamics associated with plant heatup and cooldown, realistic targets for vessel pressure and temperature limits, superior surveillance of operating parameters, and quantifiable margins with respect to designed operational limits. Therefore, plant operators of various skills levels can ascertain the current status of the pressurized vessel 17 with respect to pre-defined brittle fracture limits.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A real-time parameter margin monitoring system for an operating industrial process, said system comprising:

data acquisition means for acquiring a plurality of real-time parameters associated with said operating industrial process;

first determining means for determining a plurality of characteristic parameters from the real-time parameters;

second determining means for determining a normal operating envelope associated with said operating industrial process, with the normal operating envelope having a plurality of dimensions each of which corresponds to a different one of the characteristic parameters, and with each of the dimensions having at least one limit associated with the corresponding different one of the characteristic parameters; and output means for outputting at least one representation of at least some of the characteristic parameters and outputting representations of at least some of the limits of the normal operating envelope, said output means including means for outputting the representation of said some of the characteristic parameters and a plural dimensional plot of the normal operating envelope, with the plural dimensional plot of the normal operating envelope at least substantially surrounding or enclosing the representation of said some of the characteristic parameters.

2. The system as recited in claim 1 wherein said first determining means includes means for determining real-time values of the characteristic parameters; and wherein said output means includes display means for displaying the real-time values of the characteristic parameters.

3. A real-time parameter margin monitoring system for an operating industrial process, said system comprising:

data acquisition means for acquiring a plurality of real-time parameters associated with said operating industrial process;

first determining means for determining a plurality of characteristic parameters from the real-time parameters;

second determining means for determining a normal operating envelope associated with said operating industrial process, with the normal operating envelope having a plurality of dimensions each of which corresponds to a different one of the characteristic parameters, and with each of the dimensions having at least one limit associated with the corresponding different one of the characteristic parameters; and output means for outputting at least one representation of at least some of the characteristic parameters and outputting representations of at least some of the limits of the normal operating envelope, with the representation of said some of the characteristic parameters being associated with said some of the limits of the normal operating envelope, said output means including display means for displaying the representation of said some of the characteristic parameters, a plural dimensional plot of the normal operating envelope and said representations of some of the limits of the normal operating envelope, with the representation of said some of the characteristic parameters being displayed between said representations of some of the limits of the normal operating envelope.

4. The system as recited in claim 3 wherein the display means includes means for displaying a representation of two of the characteristic parameters and means for displaying a two dimensional plot of the normal operating envelope.

5. The system as recited in claim 3 wherein the display means includes means for displaying a representation of three of the characteristic parameters with a three dimensional plot of the normal operating envelope.

6. The system as recited in claim 3 wherein the plural dimensional plot defines a fracture envelope; and wherein the representation of said some of the characteristic parameters is displayed as a single point within the fracture envelope.

7. The system as recited in claim 6 wherein each of the characteristic parameters has a real-time value; and wherein the display means further includes means for displaying each of the real-time values.

8. A real-time parameter margin monitoring system for an operating nuclear power plant including a pressurized vessel having a fracture envelope associated therewith, said system comprising:

data acquisition means for acquiring a plurality of real-time parameters operatively associated with the pressurized vessel;

first determining means for determining a plurality of characteristic parameters from the real-time parameters;

second determining means for determining the fracture envelope of the pressurized vessel, with the fracture envelope having a plurality of dimensions each of which corresponds to a different one of the characteristic parameters, and with each of the dimensions having at least one limit associated with the corresponding different one of the characteristic parameters; and output means for outputting at least one representation of at least some of the characteristic parameters and outputting representations of at least some of the limits of the fracture envelope, said output means including means for outputting the representation of said some of the characteristic parameters and a plural dimensional plot of the fracture envelope, with the plural dimensional plot of the fracture envelope at least substantially surrounding or enclosing the representation of said some of the characteristic parameters.

9. The system as recited in claim 8 wherein the pressurized vessel has a pressure and a temperature; and wherein the real-time parameters include the pressure and the temperature of the pressurized vessel.

10. The system as recited in claim 9 wherein the characteristic parameters include a pressure, a change in temperature, a rate of change in temperature, and a minimum temperature.

11. The system as recited in claim 8 wherein said first determining means includes means for determining a real-time function including the characteristic parameters; and wherein said means for outputting includes means for displaying the real-time function within the fracture envelope.

12. A real-time parameter margin monitoring system for an operating nuclear power plant including a pressurized vessel having a fracture envelope associated therewith, said system comprising:

data acquisition means for acquiring a plurality of real-time parameters operatively associated with the pressurized vessel;

first determining means for determining a plurality of characteristic parameters from the real-time parameters, said first determining means including means for determining a real-time function including the characteristic parameters;

second determining means for determining the fracture envelope of the pressurized vessel, with the fracture envelope having a plurality of dimensions each of which corresponds to a different one of the characteristic parameters, and with each of the dimensions having at least one limit associated with the corresponding different one of the characteristic parameters; and output means for outputting at least one representation of at least some of the characteristic parameters and outputting representations of at least some of the limits of the fracture envelope, with the representation of said some of the characteristic parameters being associated with said some of the limits of the fracture envelope, said output means including means for displaying the real-time function within the fracture envelope and further including means for displaying a plot having a plurality of dimensions; wherein said some of the characteristic parameters correspond to the dimensions of the plot; and wherein said means for displaying the real-time function displays the representation of said some of the characteristic parameters as a single point within the fracture envelope.

13. A method of real-time parameter margin monitoring for an operating industrial process, said method comprising the steps of:

acquiring a plurality of real-time parameters associated with said operating industrial process;

determining a plurality of characteristic parameters from the real-time parameters;

determining a normal operating envelope associated with said operating industrial process, with the normal operating envelope having a plurality of dimensions each of which corresponds to a different one of the characteristic parameters, and with each of the dimensions having at least one limit associated with the corresponding different one of the characteristic parameters;

outputting at least one representation of at least some of the characteristic parameters;

outputting representations of at least some of the limits of the normal operating envelope; and outputting the representation of said some of the characteristic parameters and a plural dimensional plot of the normal operating envelope, with the plural dimensional plot of the normal operating envelope at least substantially surrounding or enclosing the representation of said some of the characteristic parameters.

14. The method as recited in claim 13 further comprising the steps:

determining real-time values of the characteristic parameters; and displaying the real-time values of the characteristic parameters.

15. The method as recited in claim 13 further comprising the steps:

employing a pressurized vessel having a plurality of pressures and temperatures;

providing a plurality of real-time parameters from the pressures and temperatures; and determining from the real-time parameters the characteristic parameters including a characteristic pressure, a characteristic change in temperature, a characteristic rate of change in temperature, and a characteristic minimum temperature.

16. A method of real-time parameter margin monitoring for an operating industrial process, said method comprising the steps of:

acquiring a plurality of real-time parameters associated with said operating industrial process;

determining a plurality of characteristic parameters from the real-time parameters;

determining a normal operating envelope associated with said operating industrial process, with the normal operating envelope having a plurality of dimensions each of which corresponds to a different one of the characteristic parameters, and with each of the dimensions having at least one limit associated with the corresponding different one of the characteristic parameters;

outputting at least one representation of at least some of the characteristic parameters;

outputting representations of at least some of the limits of the normal operating envelope, with the representation of said some of the characteristic parameters being associated with said some of the limits of the normal operating envelope;

displaying a plural dimensional plot of the normal operating envelope with said representations of some of the limits of the normal operating envelope; and displaying the representation of said some of the characteristic parameters between said representations of some of the limits of the normal operating envelope.

17. The method as recited in claim 16 further comprising the steps:

defining a fracture envelope with said representations of some of the limits of the normal operating envelope; and displaying the representation of said some of the characteristic parameters as a single point within the fracture envelope.

18. The method as recited in claim 17 further comprising the steps:

determining real-time values for each of the characteristic parameters; and displaying each of the real-time values.

19. The method as recited in claim 17 further comprising the steps:

displaying a representation of two of the characteristic parameters; and displaying a two dimensional plot of the normal operating envelope.

20. The method as recited in claim 17 further comprising the step:

displaying a representation of three of the characteristic parameters with a three dimensional plot of the normal operating envelope.

* * * * *